United States Patent [19]

Hammar

[11] Patent Number: 4,881,944

[45] Date of Patent: Nov. 21, 1989

[54] METHOD OF MAKING POSITIVE BATTERY PASTE

[75] Inventor: Richard H. Hammar, Utica, Mich.

[73] Assignee: General Motors Corporation, Detroit, Mich.

[21] Appl. No.: 318,396

[22] Filed: Mar. 3, 1989

[51] Int. Cl.$^4$ .............................................. H01M 4/20
[52] U.S. Cl. .................................. 29/623.5; 204/2.1; 141/1.1
[58] Field of Search ............................ 29/623.1, 623.5; 204/2.1; 423/619, 620, 559; 141/1.1, 32, 33; 429/225, 228; 419/2; 75/20, 252

[56] References Cited

U.S. PATENT DOCUMENTS

| | | | |
|---|---|---|---|
| 4,387,142 | 6/1983 | Lindholm et al. | 429/225 X |
| 4,508,147 | 4/1985 | Moseley et al. | 141/1.1 |
| 4,548,835 | 10/1985 | Takahashi et al. | 427/123 |
| 4,707,911 | 11/1987 | Kober et al. | 29/623.5 |
| 4,713,304 | 12/1987 | Rao et al. | 204/2.1 X |
| 4,758,372 | 7/1988 | Eirich et al. | 252/182.1 |

*Primary Examiner*—Anthony Skapars
*Attorney, Agent, or Firm*—Lawrence B. Plant

[57] ABSTRACT

A method of making positive lead-acid storage battery paste by initially mixing polyacetal resin particles with the leady ingredients and subsequently removing the particles during electrochemical formation of the paste to leave a plurality of electrolyte retaining macropores distributed throughout the paste to improve the reserve capacity of the battery.

3 Claims, No Drawings

METHOD OF MAKING POSITIVE BATTERY PASTE

This invention relates generally to lead-acid storage batteries and more specifically to a method for increasing the reserve capacity thereof.

Essentially, the positive active material paste of a lead-acid storage battery is formed by reacting about 75% by weight PbO and 25% by weight Pb with sufficient $H_2SO_4$ to form a mix comprising about 14% to about 18% by weight basic lead sulfate ($PbSO_4$) which serves to bind the paste together and expand ("bulk") the paste to make it porous. Too little expansion or bulking results in hard, dense plates and poor ampere-hour reserve capacity. Too much expansion, on the other hand, results in poor handling characteristics of the paste, weakening of electrodes (e.g., plates) made therefrom, shedding of the active material from the electrodes and shortening of the useful life of the battery. The paste may optionally include small amounts (i.e., $\frac{1}{8}\%$–$\frac{1}{4}\%$) of inert reinforcing fibers (e.g., polypropylene, Dynel, or the like) distributed uniformly throughout. After pasting (i.e., applying the paste to a conductive support), drying and forming (i.e., electrochemically converting the paste to $PbO_2$) the plates, the active material has a uniformly distributed microporosity (i.e., ca. 0.1–0.5 micron size pores) of about 60% which results, in part, from evaporation of water and, in part, from the electrochemical formation process.

A battery's room temperature reserve capacity is normally limited by the positive electrode. The reserve capacity obtainable for a given amount of positive active material could be increased by increasing the ability of the active material to take-up and store more $H_2SO_4$ electrolyte therein. Increasing the microporosity of the active material as a means to accommodate extra acid, however, is undesirable for the reasons set forth above.

It is an object of the present invention to provide a simple but effective method of increasing the electrolyte storage capacity of the positive active material of a lead-acid storage battery without substantially deleteriously affecting the active material or battery plates made therefrom.

This and other objects and advantages of the present invention will become more readily apparent from the description thereof which follows.

The present invention contemplates a method of making positive electrodes for a lead-acid storage battery whereby a plurality of electrolyte-retaining macropores or pockets are uniformly distributed throughout the microporous active material of the electrode to increase the electrolyte capacity of the active material. More specifically, the macropores will each have a volume thousands of times larger than that of the micropores and are formed by first mixing a plurality of polyacetal resin particles (i.e., sized to match the macropores) with the PbO/Pb active material mix and then, after bulking and pasting the mixture onto a conductive support, destroying the resin in the hot, acidic, oxidizing environment that occurs during electrochemical formation of the active material to convert it to $PbO_2$. The polyacetal resins (e.g., Delrin ®) are particularly effective for this purpose because no trace or residue of the resin remains in the active material at the end of formation to consume valuable electrolyte space or interfere with any charge/discharge reaction in the battery. The resin particles will preferably be elongated and have average aspect ratios (i.e., length to thickness) between about 2 and 10 so as to provide elongated macropores/channels extending in random directions throughout the active material. Many of the channels, so provided, will extend to the surface of the plate for ready access of electrolyte thereto and hence to the bulk of the active material. Overall porosity (and hence electrolyte retention capacity) increases ranging from about 7% to about 27% have been achieved without apparently degrading the physical properties of the active material and resin landings as high as 40% by volume have been completely cleared (i.e., resin removed) during formation without leaving a trace of residue in the macropores left behind.

By way of example, a number of batches of active material were prepared containing 10%, 20%, 30% and 40% by volume Delrin ® shavings (i.e., slivers scraped from a block of resin) which ranged from about 0.7 mm to 1.0 mm long by about 0.08 mm to 0.09 mm thick by about 0.3 mm to 0.4 mm wide for an average particle volume of about 0.025 mm$^3$. The active material itself comprised respectively 90%, 80%, 70%, and 60% by volume of a mixture of PbO and Pb (25 wt %) which was reacted with $H_2SO_4$ to form a 14% $PbSO_4$ material. Several 0.38 mm sheets of Pb were sandwiched between two layers (i.e., 1 mm thick) of epoxy, a 10 mm diameter hole drilled through each sandwich and the several holes filled with the different active material mixes to form test plates. The several test plates were then stacked together with wet tissue therebetween and allowed to stand (i.e., cure) wet for seven days at room temperature in a high humidity environment. Each plate was then assembled into a test cell between two negative plates cut down from several of the assignee hereof's standard negative commercial battery plates. Each cell was then formed in 1220 $H_2SO_4$ (i.e., 1.220 specific gravity) during which time the cell was first heated for 5 hours at 83° C., 39 hours at 60° C. and finally 24 hours at room temperature. During this time, the plates were formed at the rate of 12.3 milliamps (ma) for 24 hours, 10 ma for 20 hours and 8 ma for 24 hours. Thereafter the cells were discharged at the 200 ma rate to a cutoff voltage of 0.8 volts, recharged at 12 ma for 5 hours at room temperature and finally discharged at the 490 ma rate to a cutoff voltage of a 0.8 volts. Visual inspection of the plates so tested revealed complete removal of the macropore-forming Delrin ® following formation and no evidence that the physical properties of the active material had deteriorated at the end of the test.

While the invention has been described in terms of certain specific embodiments thereof it is not intended to be limited thereto but rather only to the extent set forth hereafter in the claims which follow.

The embodiments of the invention in which an exclusive property or privilege is claimed are defined as follows:

1. In the method of making positive electrode for a lead-acid storage battery comprising the principal steps of reacting an active material mixture of PbO and Pb with $H_2SO_4$ to form $PbSO_4$ throughout the mixture, applying the mixture to a conductive support and electrochemically forming the mixture to convert the active material into a microporous mass comprising principally $PbO_2$, the improvement comprising distributing a plurality of polyacetal resin particles substantially uniformly throughout said mixture prior to said applying and subsequently destroying said particles without a trace while electrochemically forming said active material so as to leave in their place a plurality of macropores distributed throughout the active material, said macropores being thousands of times larger than the micropores of said mass and sufficient to provide significant increased electrolyte-storage volume within the active material to improve the reserve capacity of the battery.

2. The method according to claim 1 wherein said particles comprise up to about 40% by volume of said active material.

3. The method according to claim 2 wherein said particles are elongated.

* * * * *